Feb. 27, 1968  J. W. FRANKLIN  3,370,669
STEERING MEANS FOR SELF-PROPELLED VEHICLES
Filed Aug. 16, 1965  5 Sheets-Sheet 1

INVENTOR
JOHN WARRENDER FRANKLIN
BY
Kurt Kelman
AGENT

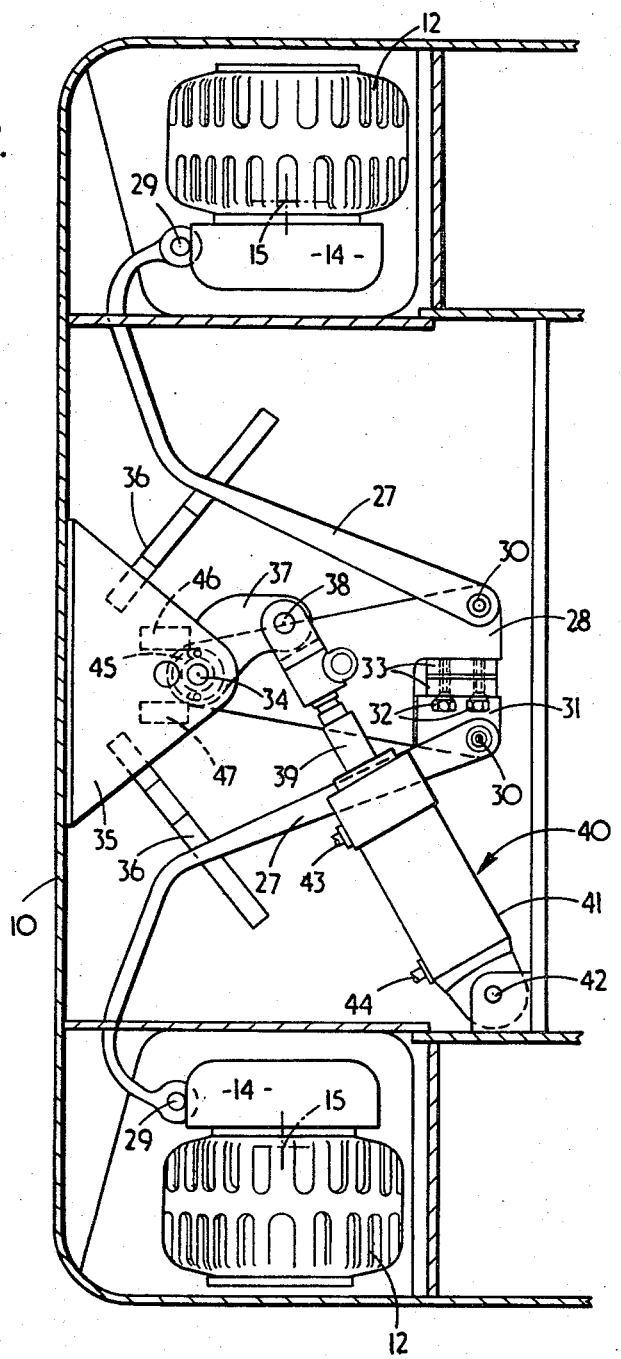

Feb. 27, 1968         J. W. FRANKLIN        3,370,669
STEERING MEANS FOR SELF-PROPELLED VEHICLES
Filed Aug. 16, 1965                             5 Sheets-Sheet 3
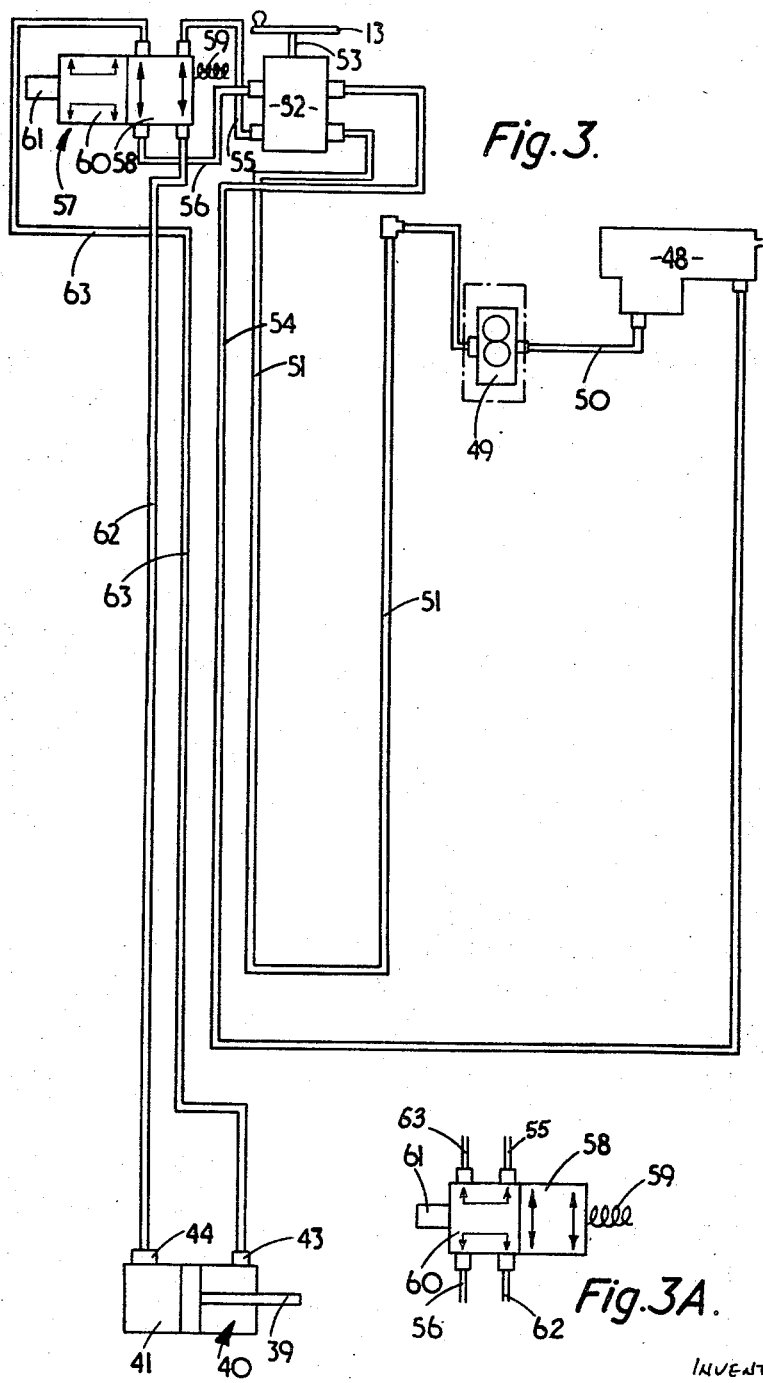
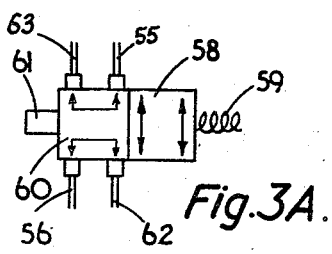
INVENTOR.
JOHN WARRENDER FRANKLIN.
BY Kurt Kelman
AGENT Feb. 27, 1968   J. W. FRANKLIN   3,370,669
STEERING MEANS FOR SELF-PROPELLED VEHICLES
Filed Aug. 16, 1965                    5 Sheets-Sheet 5

INVENTOR.
JOHN WARRENDER FRANKLIN
BY Kurt Kelman
AGENT

United States Patent Office 3,370,669
Patented Feb. 27, 1968

3,370,669
STEERING MEANS FOR SELF-PROPELLED VEHICLES
John W. Franklin, Coventry, England, assignor to Stacatruc Limited, Birmingham, England, a British company
Filed Aug. 16, 1965, Ser. No. 480,014
Claims priority, application Great Britain, Jan. 15, 1964, 1,719/64; Aug. 21, 1964, 34,200/64
3 Claims. (Cl. 180—79.2)

ABSTRACT OF THE DISCLOSURE

The specification discloses a steering system for a self-propelled, reversible vehicle in which a rotary steering control member is fixed in position between two locations on the vehicle for the operator, the location associated with each direction of travel being behind the control member when considered in that direction and the sense of the steering means being set by the operator assuming a location and pressing a pedal at the location, preferably by standing on the pedal.

---

The invention is mainly concerned with self-propelled, steerable vehicles in the form of industrial trucks such, for example as fork lift trucks and other trucks having elevatable parts. Such industrial trucks are commonly required to operate in restricted spaces, particularly when they are being used in aisles in stores and the trucks often travel in a reverse direction as much as they do in a forward direction.

In a normal steerable vehicle, if the vehicle is going forward, the operator will provide a given input to turn the vehicle, say, to the left when the operator is facing forward. If the operator now turns round, as he may do in various trucks in which control is provided for standing operators, and faces the reverse direction and controls the truck while it is reversing he will have to remember that the steering control will have to be moved in the opposite sense if he wishes to move the truck, say, to his left than he would have to have done had he been facing forward and if the truck had also been moving forwards.

This changeover can be irksome to truck operators and it is an object of the present invention to provide a compact and fool-proof steering system, particularly for an industrial truck, in which the operator stands.

According to the invention, therefore, we provide a steering system for a self-propelled vehicle having propulsion means operable to move the vehicle forwardly and reversely, such system comprising steering means to alter the direction of movement of the vehicle during both forward and reverse travel, a control having a rotary control member for the steering means, changeover means interposed between the control and the steering means and having alternately selectable first and second states arranged so that when the changeover means is in one of such states a given rotary movement of the control member will operate the steering means in one sense while when the changeover means is in the other of such states said rotary movement will operate the steering means in the opposite sense, two predetermined locations on the vehicle for the vehicle operator, one of such locations being associated with forward travel and the other such location being associated with reverse travel, the control member being situated at a fixed position between said locations, the location associated with forward travel being behind the control member when considered in the direction of forward travel and the location associated with reverse travel being behind the control member when considered in the direction of reverse travel and pedal means at each of said locations, each such pedal means being operated by an operator assuming the location associated with the pedal means, the pedal means controlling the changeover means so that the latter is in one of its states when the pedal means at one location is operated and is in the other of its states when the pedal means at the other location is operated.

By "sense" as used herein we mean that, assuming that the vehicle travels contnuously forwardly or reversely, operation of the steering means in one sense will turn the vehicle, say, to the right and operation of the steering means in the other sense will turn the vehicle to the left. Obviously, if operation of the steering means in said one sense turned the vehicle to the right then operation of the steering means in the other sense would turn the vehicle to the left.

By embodying the invention in an industrial truck having, for example, driven and steerable rear wheels and a steering wheel, the truck may be arranged so that when it is going forward the operator will turn the steering wheel in the direction in which he wishes to go, i.e. to the left and anti-clockwise, and this will cause the truck to move to the operator's left although the steerable wheels will be directed towards the operator's right since they are the rear wheels and will be turned about their pivots in a clockwise direction.

If now the truck is moving reversely with the operator facing the direction of movement and he wishes to turn the truck to his left, he again turns the wheel in the direction he wishes to go, i.e. to the left and anti-clockwise, and, since the steerable wheels are now leading, they will have to turn to the left, i.e. clockwise, to cause the truck to move to the operator's left.

If the changeover means is operated when the truck changes its direction of motion then the turning by the operator of the wheel in an anti-clockwise direction when he is traveling in reverse will in fact turn the wheels to his left and turn the truck to his left.

In other words, for a given input on the control member, the steering wheel in this case, the input consisting of anti-clockwise rotation of the steering wheel, the truck will be caused to turn to the operator's left whether it is travelling forwardly or reversely so long as the operator is facing the direction of motion. It follows that the sense of the steering mechanism is the same whether the truck is travelling forwardly or reversely so long as the operator faces the direction of motion and the changeover means is operated accordingly.

The invention will now be described in detail by way of example with reference to the accompanying drawings in which:

FIGURE 2 is a horizontal section through the truck of FIGURE 1 showing the steering mechanism;

FIGURE 3 is a diagram of the hydraulic circuit of the steering mechanism of the truck of FIGURE 1 showing a change-over valve in its de-energised state;

FIGURE 3A is a detail view showing the changeover valve of FIGURE 3 in its energised state;

Figure 1:
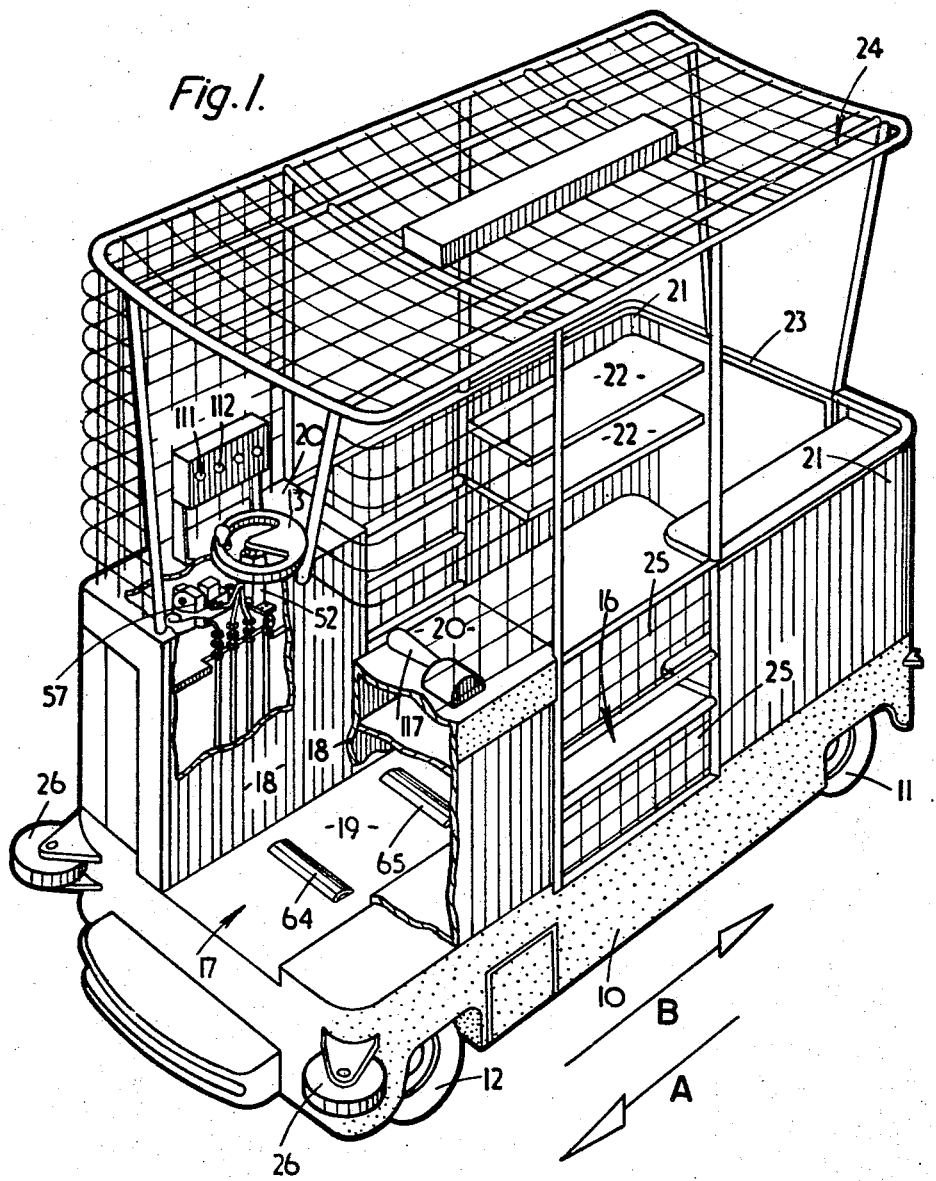
FIGURE 1 is a perspective view, partly cut away, of one form of industrial truck embodying the invention.

Referring now to FIGURE 1, this shows an industrial truck comprising a motorised chassis indicated generally at 10 having two pairs of ground wheels, one wheel of one pair being indicated at 12. The ground wheels 12 are steerable by means which will hereinafter be described and their steering is controlled by means of a steering wheel 13. The wheels 12, which are also shown in FIGURE 2, are also driven by means of traction units indicated at 14 and are pivotable about substantially vertical axes indicated at 15 whereby the truck may be steered.

The truck also comprises an elevatable platform which is indicated generally at 16 and this platform has an operator's station which is indicated generally at 17. The platform may be raised from the position shown in FIGURE 1 by means of lazy-tongs mechanism which is not shown and which does not form part of the present invention. The platform itself has, at its left-hand end in FIGURE 1, vertical walls 18 which define the sides of the operator's station, the floor of such station being provided by a member 19. The vertical walls 18 terminate, at their upper ends, in horizontal walls 20 which carry controls which will hereinafter be described. The right-hand end of the platform 16 as shown in FIGURE 1 is provided with circumscribing walls 21, shelves 22 and an openable gate 23. The whole platform is covered by a wire mesh canopy indicated generally at 24 and drop gates 25 are provided at the sides of the platform.

Although this part of the construction of the truck does not form part of the present invention it is to be noted that the truck is intended for moving along aisles between racks in a store and may be raised or lowered by the operator who stands on the platform, the operator being able to lean out of the truck, when the latter is stationary, and pick items required from the racks and place them on the shelves 22 and can thus load the truck with a desired order from the store. The truck may be guided along the aisles by means of rollers 26 engaging abutments along the bottoms of the aisles.

Referring now to FIGURE 2, the steerable wheels 12 with their associated traction units 14 are connected by means of pivoted links 27 with an operating arm 28. The links 27 are pivoted at 29 to the traction units 14 and at 30 to the operating arm 28. The lower link 27 in FIGURE 2 is connected to a member 31 which is connected to the operating arm 28 proper by means of bolts 32 which pass through packing pieces 33 whereby the spacing between the pivots 30 may be adjusted when the truck is assembled.

The operating arm 28 is pivoted at 34 to a triangular trunnion 35 secured to the chassis 10 of the truck. The chassis is strengthened adjacent the trunnion by means of webs 36. The operating arm 28 has rigidly connected thereto an actuating lug 37 which is pivotally connected at 38 to the piston rod 39 of a hydraulic piston and cylinder assembly indicated generally at 40. The cylinder 41 of the assembly 40 is pivoted at 42 to the chassis of the truck and is provided with ports 43 and 44 adjacent its ends whereby hydraulic fluid can be introduced into the cylinder to move the piston and hence the piston rod 39 to steer the vehicle.

The operating arm 28 is also provided with a cam 45 which is arranged to operate micro-switches 46 and 47. When the steerable wheels are in their central or neutral position, both switches 46 and 47 are operated and when the wheels are out of such position only one of the switches is operated. As will hereinafter be described, these switches operate warning lights so that the operator can know whether he has set the steering wheel to travel straight ahead or to one side or the other.

Figure 4:
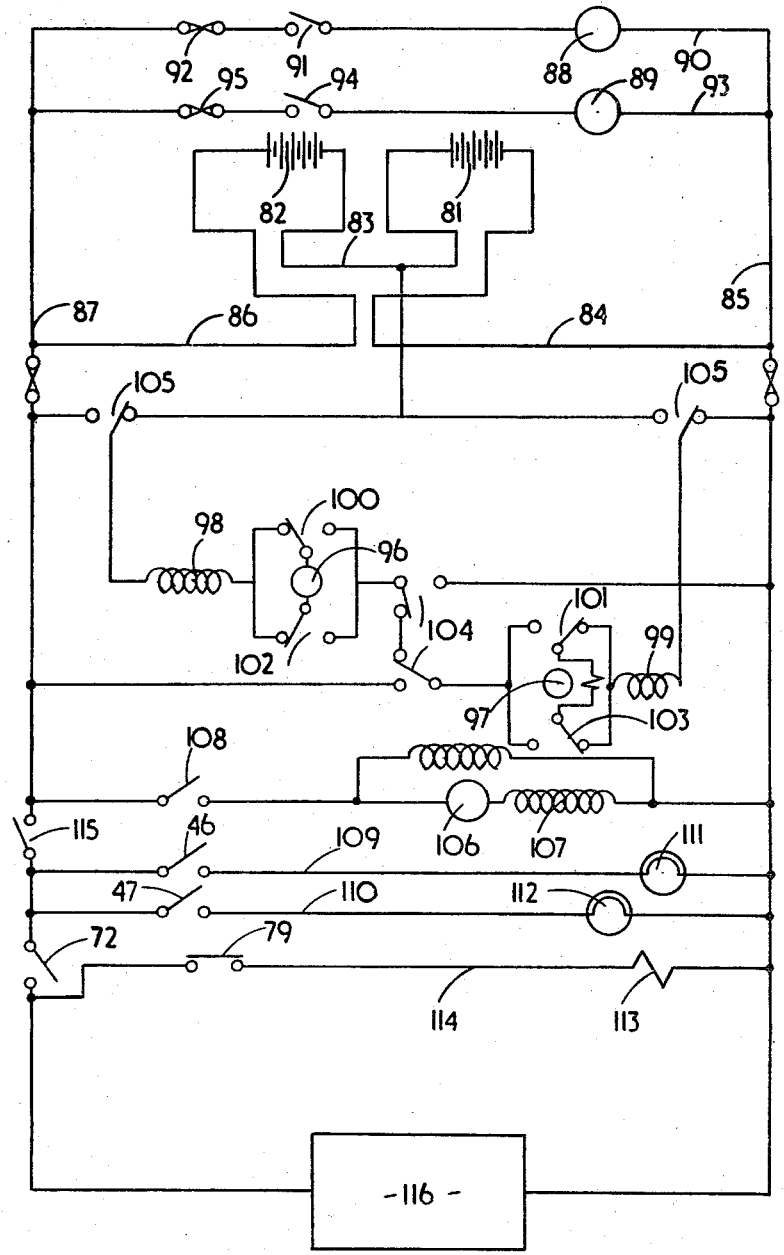
FIGURE 4 is a simplified electric circuit of the truck of FIGURE 1.

Referring now to FIGURE 3, the hydraulic piston and cylinder assembly 40 is supplied with pressure fluid from a tank 48 by means of a steering pump 49 driven by an electric motor which will be described in relation to the electric circuit shown in FIGURE 4. The pump 49 draws hydraulic fluid along the conduit 50 and delivers it along the conduit 51 to a steering control 52 whose operating shaft 53 carries the steering wheel, or control member 13.

The control 52 is of a known type made by Danfoss of Denmark and known as the Danfoss Orbitrol Steering Control. The control is, in effect, a metering valve. When the steering wheel 13 is in its neutral position, oil delivered to the control 52 along the line 51 will be returned through the line 54 to the tank 48. If the shaft 53 is now turned from its neutral position, some pressure fluid will be delivered from the control 52 through one of the outlet conduits 55 or 56, depending on the direction in which the steering wheel 13 is turned. For the purpose of the following description it will be assumed that if the steering wheel is turned anti-clockwise then oil will flow through the outlet conduit 55 whereas if the wheel is turned clockwise oil will flow out through the outlet conduit 56. The oil delivered into the conduit 55 or 56 then passes to a changeover valve indicated generally at 57 which is held in one state, indicated by the block 58, by means of a spring 59 but may be moved to another state, indicated by the block 60, by energisation of a solenoid 61.

When the valve 57 is in the first state, as indicated by the block 58, pressure fluid flows from the discharge conduit 55 into the line 62 to the left-hand end of the piston and cylinder assembly 40 and enters the cylinder through the port 44. On the other hand, pressure fluid discharged into the discharge conduit 56 is delivered into the line 63 and will enter the cylinder 41 at the right-hand end in FIGURE 3 through the port 43.

In the first state of the valve 57, therefore, anti-clockwise rotation of the steering wheel 13 will cause discharge of oil into the discharge conduit 55 and thence to the left-hand end of the cylinder 41 and will turn the wheels 12 clockwise when viewed in FIGURE 2. Conversely, clockwise rotation of the steering wheel 13 with the valve 57 in its first state will cause oil to be delivered to the line 63 and will move the wheels 12 anti-clockwise in FIGURE 2. Thus assuming that the truck is moving reversely, i.e. in the direction of the arow B in FIGURE 1, anti-clockwise rotation of the steering wheel 13 will cause the truck to move to the operator's left, assuming that he is facing the direction of motion and clockwise rotation of the steering wheel 13 will cause the truck to move to the operator's right, again assuming that is is facing the direction of motion.

If now the solenoid 61 is energised, as will hereinafter be described, the valve 57 assumes its second state and the connections are then as shown in the detail view of FIGURE 3A. That is to say oil delivered from the control 52 through the outlet conduit 55 will pass to the line 63 and to the right-hand end of the cylinder 41 through the port 43. Referring to FIGURE 2, this will thus move the piston rod 39 downwardly and into the cylinder 41 and will turn the wheels 12 anti-clockwise about their pivot axes 15. As a result, assuming that the operator is facing, and the truck is moving, forwardly i.e. in the direction of the arrow A, the truck will move to the operator's left. It follows that anti-clockwise rotation of the steering wheel 13 by the operator will, assuming that the operator is facing in the direction of the motion, always move the truck to the operator's left assuming that the changeover valve 57 is in its first state as indicated by the block 58 when the truck is moving reversely in the direction of the arrow B and that the changeover valve 57 is always in its second state indicated by the block 60 when the truck is moving in the forwardly, i.e. in the direction of the arrow A.

Conversely, if the wheel 13 is now moved in a clockwise direction, pressure fluid will be discharged to the discharge conduit 56 and from thence to the line 62 and to the left-hand of the cylinder in FIGURE 3 through the port 44. Referring now to FIGURE 2, oil fed into the port 44 will move the piston rod 39 upwardly and will turn the wheels 12 clockwise about their pivots and will move the truck to the operator's right assuming that he is facing the direction of motion. It follows that clockwise rotation of the steering wheel 13 will always move the truck to the operator's right assuming that he is facing the direction of motion and that the changeover valve 57 is in its first state, indicated by the block 58, when the truck is moving reversely and is in its second state, indicated by the block 60, when the truck is moving forwardly.

Figure 5:
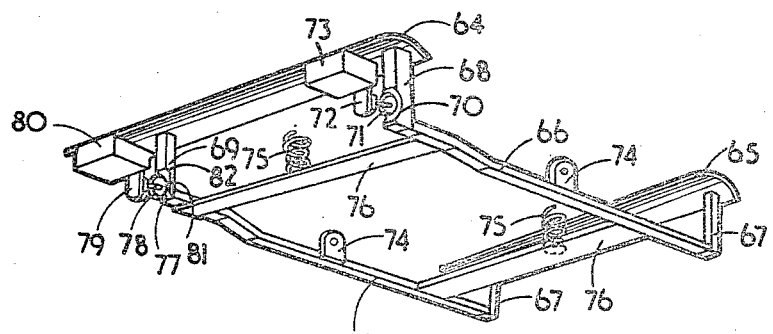
FIGURE 5 is a perspective view of the actuating means for the changeover valve of the truck of FIGURE 1.

The truck is arranged so that the changeover valve is automatically moved from its first state to its second state when the operator changes his position so as to face the direction of movement of the truck. Operation of the changeover valve 57 is effected by means of two pedals 64 and 65 shown in FIGURES 1 and 5. Referring to FIGURE 5, the pedals are interconnected by connecting bars 66 which, at their one ends, have vertical stalks 67 to support the pedal 65. At their other ends, the arm 66 carry vertical stalks 68 and 69. The stalk 68 is provided with a concave depression indicated at 70 within which rests a roller 71 on the arm of a micro-switch 72 mounted on a block 73 secured to the platform. The connecting bars 66 have lugs 74 which are pivoted to the chassis to allow substantially vertical movement of the pedals 64 and 65 The pedals are retained, in the absence of the downward pressure, in a substantially neutral position by means of springs 75 acting on cross bars 76.

The depression 70 is so shaped that, whichever of the pedals 64 and 65 is depressed, the switch 72 will be operated for the purpose described below.

The vertical stalk 69, has a cut away portion 77 which engages a roller 78 of a micro-switch 79 supported on a block 80 secured to the platform 16. The cut away portion 77 has a vertical portion 81 and an inclined portion 82. The arrangement is such that, if the pedal 64 is depressed, the stalk 69 moves downwards and the inclined portion 82 co-operates with the roller 78 to close the switch 79. On the other hand, if the pedal 65 moves downwardly, the vertical stalk 69 will move upwardly and, due to the vertical portion 81, it will not close the switch 79.

The pedals 64 and 65 are arranged so that the control member, i.e. the steering wheel 13, is between them and it is intended that the operator of the truck when the latter is moving forward shall stand upon the pedal 65 and this will have the effect of closing the switch 72. On the other hand, when the truck is moving in its reverse direction, it is intended that the operator shall stand on the pedal 64 and this will have the effect of closing both the switches 72 and 79 and this will have the effect of closing only the switch 72. It will be apparent from FIGURE 1, that if the truck is going forward in the direction of the arrow A it will be convenient for the operator to stand on the pedal 65 since he will face the direction of motion and will have the steering wheel 13 to his left-hand side and in front of him. Conversely, if the truck is moving in a reverse direction, it will be convenient for the operator to stand on the pedal 64 and the steering wheel 13 will again be in front of him and to his right.

The electrical circuit of the control for the truck will now be described in relation to FIGURE 4.

The truck is battery powered and the battery is in two halves which are indicated at 81 and 82. The adjacent ends of the battery halves are connected by a line 83 and the other pole of the battery half 81 is connected by a line 84 to a common line 85. Similarly, the other pole of the battery half 82 is connected by a line 86 to a common line 87.

The lifting of the platform 16 is controlled by means of two pumps operating to supply hydraulic fluid to hydraulic cylinders (not shown), the pumps being driven by motors 88 and 89. The motor 88 is in a line 90 extending between the common lines 85 and 87, the line containing a motor contactor 91 and a fuse 92. In a similar manner, the motor 89 is in a line 93 extending between the common lines 85 and 87, the line 93 containing a contactor 94 and a fuse 95.

The traction units of the truck include two drive motors which are indicated at 96 and 97, the field coils of such motors being indicated at 98 and 99 respectively. Forward motion of the truck is obtained by changing over the contactors 100 and 101 (while leaving the contactors 102 and 103 as shown) and reverse motion can be obtained by changing over the contactors 102 and 103 (while leaving the contactors 100 and 101 as shown).

The motors may be arranged in series or in parallel across the lines 85 and 87 by suitable operation of series-parallel switches 104. The motors may be energized by the whole of the battery 81, 82 or by half thereof depending on operation of the contactor 105. The steering pump 49 in FIGURE 3 is driven by a motor 106 whose field coil is indicated at 107 and is connected between the lines 85 and 87 and is controlled by a contactor 108. The switches 46 and 47 are in lines 109 and 110 respectively extending across the common lines 85 and 87 and control lights 111 and 112 respectively, the lights also being shown in FIGURE 1.

The coil of the solenoid 61 is indicated at 113 and is in a line 114 extending between the common lines 85 and 87, the line also containing the switch 79 shown in FIGURE 5.

In the common line 87 between the line 110 and the line 114 is the switch 72 which is shown in FIGURE 5. The common line 87 also includes a key switch 115.

Also connected across the lines 85 and 87 are the speed controls of the truck which are conventional and are thus therefore indicated generally by the block 116. These speed controls include a rotary acceleration control indicated at 117 in FIGURE 1 and which is so arranged that rotation of the control 117 in one direction causes the truck to move forward at a speed depending on the distance that the control is rotated and rotation of the control 117 in the opposite direction causes the trunk to move in the reverse sense at a speed depending on the extent of rotation of the control.

Operation of the truck is as follows, when the operator gets into the truck he has first to close the key switch 115 then in order to cause the truck to move he has to close the switch 72. This means, as described above, that he has to stand on one of the pedals 64 and 65 and whichever pedal he stands on he will operate the switch 72 and will close the same.

If the operator stands on the pedal 64 he will also close the switch 79 which will energise the coil 113 of the solenoid 61 and will move the changeover valve 57 to its second state as shown in FIGURE 3A. On the other hand, if the operator stands on the pedal 65, he will only close the switch 72 and will not close the switch 79 so that the coil 113 of the solenoid 61 will not be energised and the changeover valve 57 will be in its first state indicated by the block 58.

Since the steering wheel 13 is located between the pedals 64 and 65, if the operator wishes to move the truck forwardly, in the direction of the arrow A, in order to have the steering wheel in front of him he will have to stand on the pedal 65 in order to cause the truck to move forwardly and standing on this pedal will close only the switch 72 with the result that operation of the steering wheel will move the steerable wheels 12 in the directions described above.

On the other hand, if the operator wishes to move the truck rearwardly, in the direction of the arrow B, in order to have the steering wheel in front of him, he will have to stand on the pedal 64 in order to close the switch 72 and this will result in the closing of the switch 79 so that the changeover valve 57 will move to its second state as indicated in FIGURE 3A so that rotation of the steering wheel 13 will have the effect described above for the valve in that state.

It follows that so long as the operator of the truck faces the direction in which the truck is travelling and stands on the appropriate pedal 64 or 65, he will place the changeover valve in the appropriate state and will thus retain the sense of his steering as described in detail above.

It will be seen that the invention provides a comparatively simple steering means for self-propelled vehicles and particularly for industrial trucks which will lighten the operator's task where the vehicle spends a comparatively large portion of its life moving in a reverse direction.

What I claim then is:

1. A steering system for a self-propelled vehicle having propulsion means operable to move the vehicle forwardly and reversely, such system comprising steering means to alter the direction of movement of the vehicle during both forward and reverse travel, a control having a rotary control member for the steering means, changeover means interposed between the control and the steering means and having alternately selectable first and second states arranged so that when the changeover means is in one of such states a given rotary movement of the control member will operate the steering means in one sense while when the changeover means is in the other of such states said rotary movement will operate the steering means in the opposite sense, two predetermined locations on the vehicle for the vehicle operator, one of such locations being associated with forward travel and the other such location being associated with reverse travel, the control member being situated at a fixed position between said locations, the location associated with forward travel being behind the control member when considered in the direction of forward travel and the location associated with reverse travel being behind the control member when considered in the direction of reverse travel and pedal means at each of said locations, each such pedal means being so located that the operator operating the same normally must stand on such pedal means, the pedal means controlling the changeover means so that the latter is in one of its states when the pedal means at one location is operated and is in the other of its states when the pedal means at the other location is operated.

2. A system according to claim 1 including a platform on which the operator stands for controlling the vehicle, the pedal means being mounted on the platform so as to be stood on by the operator.

3. A system according to claim 1 wherein the steering means comprises a hydraulic piston and cylinder assembly supplied with pressure fluid from two ports on the control and wherein the changeover means comprises a changeover valve to selectively reverse the connections between the ends of the cylinder and said ports.

References Cited
UNITED STATES PATENTS 3,103,985    9/1963    Price      180—79.2
3,195,913    7/1965    Hallsworth      180—77

LEO FRIAGLIA, *Primary Examiner.*

BENJAMIN HERSH, *Examiner.*

J. H. BRANNEN, L. D. MORRIS, *Assistant Examiners.*